US012759913B2

(12) United States Patent
Miyauchi et al.

(10) Patent No.: US 12,759,913 B2
(45) Date of Patent: Oct. 13, 2026

(54) WATER TREATMENT METHOD, CONTROL APPARATUS, AND WATER TREATMENT SYSTEM

(71) Applicant: Yokogawa Electric Corporation, Tokyo (JP)

(72) Inventors: Yuki Miyauchi, Musashino (JP); Tomoyuki Taguchi, Musashino (JP); Yasuhiro Matsui, Musashino (JP); Hiroyuki Katayama, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 367 days.

(21) Appl. No.: 18/278,598

(22) PCT Filed: Dec. 27, 2021

(86) PCT No.: PCT/JP2021/048686
§ 371 (c)(1),
(2) Date: Aug. 23, 2023

(87) PCT Pub. No.: WO2022/181047
PCT Pub. Date: Sep. 1, 2022

(65) Prior Publication Data
US 2023/0391645 A1 Dec. 7, 2023

(30) Foreign Application Priority Data
Feb. 26, 2021 (JP) ................................ 2021-030935

(51) Int. Cl.
*B01D 69/02* (2006.01)
*C02F 1/00* (2023.01)
(Continued)

(52) U.S. Cl.
CPC .............. *C02F 1/685* (2013.01); *B01D 69/02* (2013.01); *C02F 1/008* (2013.01); *C02F 3/006* (2013.01);
(Continued)

(58) Field of Classification Search
CPC .... C02F 1/685; C02F 1/008; C02F 2209/001; C02F 2209/006; C02F 2209/06;
(Continued)

(56) References Cited

U.S. PATENT DOCUMENTS

2007/0131033 A1* 6/2007 Stencel ................ G01N 33/383 137/551
2009/0266762 A1* 10/2009 Ito ........................... C02F 1/441 210/636
(Continued)

FOREIGN PATENT DOCUMENTS

CN 107075554 A * 8/2017 ............. G01N 33/18
CN 108629502 A * 10/2018 ............. G01N 33/18
(Continued)

OTHER PUBLICATIONS

Gibson et al, "Measuring and mitigating inhibition during quantitative real time PCR analysis of viral nucleic acid extracts from large-volume environmental water samples", published in Water Research, vol. 46, Issue 13, Sep. 1, 2012, pp. 4281-4291. (Year: 2012).*
(Continued)

*Primary Examiner* — Joseph W Drodge
(74) *Attorney, Agent, or Firm* — RANKIN, HILL & CLARK LLP

(57) ABSTRACT

A water treatment method including: a concentration step of concentrating microorganisms in sample water to purify a concentrate; a detection step of detecting an inhibitor contained in the sample water or the concentrate; a determina-
(Continued)

tion step of determining whether to perform a removal step based on a result of the detection in the detection step; the removal step of removing the inhibitor from the concentrate in a case where the removal step is determined to be performed in the determination step; and a measurement step performed after the determination step or the removal step, of measuring the microorganisms contained in the concentrate.

12 Claims, 11 Drawing Sheets

(51) Int. Cl.
*C02F 1/68* (2023.01)
*C02F 3/00* (2023.01)

(52) U.S. Cl.
CPC .... *B01D 2325/14* (2013.01); *C02F 2209/001* (2013.01); *C02F 2209/006* (2013.01); *C02F 2209/06* (2013.01); *C02F 2209/07* (2013.01); *C02F 2209/36* (2013.01); *C02F 2303/04* (2013.01)

(58) Field of Classification Search
CPC .............. C02F 2209/07; C02F 2209/36; C02F 2303/04; C02F 3/006; B01D 69/02; B01D 2325/14; B01D 61/22; G01N 1/40; G01N 33/1826; G01N 1/4005; G01N 33/18; C12Q 1/04; C12Q 1/00; C12Q 1/02; C12Q 1/06; C12Q 1/24; C12Q 3/00
See application file for complete search history.

(56) References Cited

U.S. PATENT DOCUMENTS

| | | | | |
|---|---|---|---|---|
| 2009/0326211 A1* | 12/2009 | Boyette | C12Q 1/24 | 536/25.4 |
| 2012/0003626 A1* | 1/2012 | Kshirsagar | G01N 1/40 | 435/239 |
| 2014/0241956 A1* | 8/2014 | Page | G01N 1/4077 | 422/534 |
| 2017/0218455 A1* | 8/2017 | Steelman | C12Q 1/6844 | |
| 2019/0041835 A1* | 2/2019 | Cella | G05B 19/4183 | |
| 2022/0003670 A1* | 1/2022 | Mcbrady | G02B 6/4204 | |

FOREIGN PATENT DOCUMENTS

| | | | | |
|---|---|---|---|---|
| CN | 111310976 A * | 6/2020 | G06Q 50/26 | |
| CN | 211043354 U * | 7/2020 | G01N 33/18 | |
| CN | 112573641 A * | 3/2021 | C02F 3/00 | |
| JP | 6-304546 A | 11/1994 | | |
| JP | 2005-262048 A | 9/2005 | | |
| JP | 2007-98305 A | 4/2007 | | |
| JP | 2009-673 A | 1/2009 | | |
| JP | 2015-181356 A | 10/2015 | | |
| JP | 2016-221480 A | 12/2016 | | |
| KR | 10-1656057 B1 | 9/2016 | | |
| WO | 2014/148580 A1 | 9/2014 | | |

OTHER PUBLICATIONS

English translation of CN_108629502A, Oct. 9, 2018 (Year: 2018).*
English translation of CN_108629502_A, Jun. 19, 2020 (Year: 2020).*
English translation of CN_107075554_A, Aug. 18, 2020 (Year: 2020).*
English translation of CN_211043354_U, Jul. 17, 2020 (Year: 2020).*
Escapenet machine translation of CN112573641A, Mar. 30, 2021. (Year: 2021).*
Katayama et al, "Development of a Virus Concentration Method and Its Application to Detection of Enterovirus and Norwalk Virus from Coastal Seawater", Applied and Environmental Microbiology, 2002, vol. 68, No. 3, pp. 1033-1039; Cited in Specification.
Hata et al, "Sequenti al treatment using a hydrophobic resin and gel filtration to improve viral gene quantification from highly complex environmental concentrates", Water Research, ScienceDirect, 2020, vol. 174, 115652, total 8 pages; Cited in Specification.
Extended European Search Report dated Jan. 16, 2025 issued for European patent application No. 21928140.9.
Jin Min et al: "Development of a Novel Filter Cartridge System with Electropositive Granule Media to Concentrate Viruses from Large Volumes of Natural Surface Water", Environmental Science & Technology, vol. 48, No. 12, Jun. 6, 2014 (Jun. 6, 2014), pp. 6947-6956, Retrieved from the Internet: URL:https://pubmed.ncbi.nlm.nih.gov/24865258/>; Cited in Extended European Search Report.
Chinese Office Action (CNOA) dated Jun. 19, 2025 issued for Chinese patent application No. 202180094034.X and its English machine translation.
Tatsuya Asami et al., "Evaluation of virus removal efficiency of coagulation-sedimentation and rapid sand filtration processes in a drinking water treatment plant in Bangkok, Thailand", Water Research, vol. 101, 2016, pp. 84-94; Cited in CNOA.
Chinese Office Action dated Mar. 31, 2026 for Chinese Patent Application No. 202180094034X; English machine translation.
Chinese Office Action dated Jan. 26, 2026 and issued for Chinese Patent application No. 202180094034.X and its English machine translation.

* cited by examiner

100

WATER TREATMENT METHOD, CONTROL APPARATUS, AND WATER TREATMENT SYSTEM

CROSS-REFERENCE TO RELATED APPLICATION

The present application claims priority to and the benefit of Japanese Patent Application No. 2021-030935 filed Feb. 26, 2021, the entire contents of which are incorporated herein by reference.

TECHNICAL FIELD

This disclosure relates to a water treatment method, a control apparatus, and a water treatment system.

BACKGROUND

Microorganisms in water such as bacteria and viruses have an isoelectric point in a region where surface charge is weakly acidic, are negatively charged in neutral to alkaline water, and positively charged in acidic water. Conventionally, methods of capturing microorganisms from water using this property are known. For example, Non-Patent Literature (NPL) 1 describes a negatively charged membrane method, which uses a negatively charged membrane to capture microorganisms from water.

Microbial concentrates purified using, for example, a negatively charged membrane method are collected and used in polymerase chain reaction (PCR) based assays for qualitative or quantitative measurement of microorganisms in aquatic environments. During a microbial concentration process to purify the concentrate, inhibitors that may inhibit PCR and result in inaccurate quantification of microbial measurements are also concentrated. For example, NPL 2 describes a method that removes concentrated inhibitors in the microbial concentration process, resulting in more accurate quantification.

CITATION LIST

Non-Patent Literature

NPL 1: Katayama et al, "Development of a Virus Concentration Method and Its Application to Detection of Enterovirus and Norwalk Virus from Coastal Seawater", Applied and Environmental Microbiology, March 2002, Vol. 68, No. 3, p. 1033-1039

NPL 2: Hata et al, "Sequential treatment using a hydrophobic resin and gel filtration to improve viral gene quantification from highly complex environmental concentrates", Water Research, May 2020, Vol. 174, 115652

SUMMARY

Technical Problem

However, in water treatment infrastructure, including, for example, water purification plants, sewage treatment plants, water reclamation facilities, and desalination plants, the amount of inhibitors in processed water may vary widely within a day or on different days. In water treatment processes that are designed to remove inhibitors, the removal process may be performed excessively even when the inhibitor removal process is not absolutely necessary. This has resulted in unnecessary costs. In addition, unnecessary costs resulted from the use of excessive reagents in the removal process.

It would be helpful to provide a water treatment method, a control apparatus, and a water treatment system able to control unnecessary costs in a water treatment process.

Solution to Problem

A water treatment method according to at least one embodiment comprises: a concentration step of concentrating microorganisms in sample water to purify a concentrate; a detection step of detecting an inhibitor contained in the sample water or the concentrate; a determination step of determining whether to perform a removal step based on a result of the detection in the detection step; the removal step of removing the inhibitor from the concentrate in a case where the removal step is determined to be performed in the determination step; and a measurement step performed after the determination step or the removal step, of measuring the microorganisms contained in the concentrate.

This allows control of unnecessary costs in a water treatment process. For example, by performing the determination step described above, excessive performing of the removal step may be controlled when the removal step of removing the inhibitor is not absolutely necessary. For example, when the inhibitor is not detected in a water treatment system, an unnecessary removal step that incurs a cost need not be performed. For example, in a water treatment system, upon determining that an index value of an inhibitor does not reach a predefined threshold value, an unnecessary removal step that incurs cost need not be performed.

According to an embodiment, in the determination step, whether an index value of the inhibitor has reached a threshold value is determined, and in the determination step, upon determining that the index value of the inhibitor has reached the threshold value, the removal step is determined to be performed. This allows a precise decision to be made as to whether or not to perform the removal step based on an objective index value that is accurately quantified. Switching precisely between two different water treatment processes depending on the index value of the inhibitor is possible. As a result, the reliability of a water treatment system as a system is improved, and convenience is also improved for users of the water treatment system.

According to an embodiment, in the removal step, a removal method for removing the inhibitor from the concentrate is optimized according to the index value of the inhibitor. This allows further reduction of costs in a water treatment process. For example, costs may be reduced by changing the removal method depending on the amount of the inhibitor or by appropriately determining other conditions such as reagent amounts. In addition, reliability of an inhibitor removal effect is improved because the removal step is optimized according to the monitored index value of the inhibitor. As a result, reliability of measurement in the subsequent microorganism measurement step is also improved.

According to an embodiment, the detection step is performed after the concentration step, and in the detection step, the inhibitor contained in the concentrate is detected. This allows the presence or absence of the inhibitor or the index value of the inhibitor to be determined directly for the concentrate used in the subsequent microorganism measurement step. The determination step described above may be performed based on a sample that directly reflects status of the inhibitor in the concentrate used in the subsequent microorganism measurement step.

According to an embodiment, the detection step is performed before the concentration step, and in the detection step, the inhibitor contained in the sample water is detected. This allows a sample to be used for detection of an inhibitor before microbial concentration. Therefore, an ample sample amount may be secured, and a method of detecting the inhibitor that requires a large sample amount may be performed. Further, the index value of the inhibitor may be calculated prior to microbial concentration, and therefore a rate of microbial concentration in the concentration step may be changed according to the index value of the inhibitor calculated.

According to an embodiment, the concentration step includes a primary concentration step and a secondary concentration step performed after the primary concentration step. This allows microorganisms to be concentrated and the concentrate purified even for large volumes of sample water.

According to an embodiment, the detection step is performed after the primary concentration step, and in the detection step, the inhibitor contained in a primary concentrate is detected. This allows the detection step to be performed to determine whether the removal step is necessary without loss of sample when volume is scarce after the secondary concentration.

According to an embodiment, the detection step is performed after the secondary concentration step, and in the detection step, the inhibitor contained in a secondary concentrate is detected. This allows the presence or absence of the inhibitor or the index value of the inhibitor to be determined directly for the secondary concentrate used in the subsequent microorganism measurement step. The determination step described above may be performed based on a sample that directly reflects status of the inhibitor in the secondary concentrate used in the subsequent microorganism measurement step.

A control apparatus according to at least one embodiment comprises a sensor operable to detect an inhibitor contained in sample water or a concentrate purified by concentrating microorganisms in the sample water; and a controller operable to determine whether to remove the inhibitor from the concentrate based on a result of the detection by the sensor, wherein when the controller determines that the inhibitor is to be removed from the concentrate, the controller controls a water treatment process so that the concentrate passes through a removal apparatus operable to remove the inhibitor from the concentrate prior to measurement of the microorganisms.

This allows control of unnecessary costs in a water treatment process. For example, by performing the determination step described above, the control apparatus may control excessive performing of the removal step when the removal step of removing the inhibitor is not absolutely necessary. For example, when the control apparatus does not detect the inhibitor, a water treatment system need not perform an unnecessary removal step that incurs a cost. For example, a water treatment system need not perform an unnecessary removal step that incurs a cost when the control apparatus determines that the index value of the inhibitor does not reach a predefined threshold value.

A water treatment system according to at least one embodiment comprises: the control apparatus; a concentration apparatus operable to concentrate the microorganisms in the sample water to purify the concentrate; the removal apparatus operable to remove the inhibitor from the concentrate; and a measurement apparatus operable to measure the microorganisms in the concentrate.

This allows control of unnecessary costs in a water treatment process. For example, by performing the determination step described above, the control apparatus may control excessive performing of the removal step when the removal step of removing the inhibitor is not absolutely necessary. For example, when the control apparatus does not detect the inhibitor, a water treatment system need not perform an unnecessary removal step that incurs a cost. For example, a water treatment system need not perform an unnecessary removal step that incurs a cost when the control apparatus determines that the index value of the inhibitor does not reach a predefined threshold value.

Advantageous Effect

According to the present disclosure, a water treatment method, a control apparatus, and a water treatment system able to control unnecessary costs in a water treatment process are provided.

DETAILED DESCRIPTION

Embodiments of the present disclosure are described below with reference to the drawings.

The following is an example of equipment that purifies a microbial concentrate by a negatively charged membrane method. As used herein, "microorganisms" include, for example, protozoa, bacteria, viruses, and the like. "Protozoa" include, for example, *Cryptosporidium, Giardia*, and the like. "Bacteria" include, for example, *Escherichia coli,*

*Staphylococcus, Vibrio cholerae, Mycobacterium tuberculosis, Helicobacter pylori*, and the like. "Viruses" include, for example, noroviruses, adenoviruses, enteric viruses, pepper mild mottle virus (PMMoV), and the like. As an example, the following describes purification of a virus concentrate, but similar equipment and methods may be applied to other particulates such as bacteria.

Microorganisms have a property of being negatively charged in neutral to alkaline waters. Sample water to be processed according to the negatively charged membrane method is neutral to alkaline. Accordingly, these microorganisms are negatively charged in the sample water.

Figure 8:
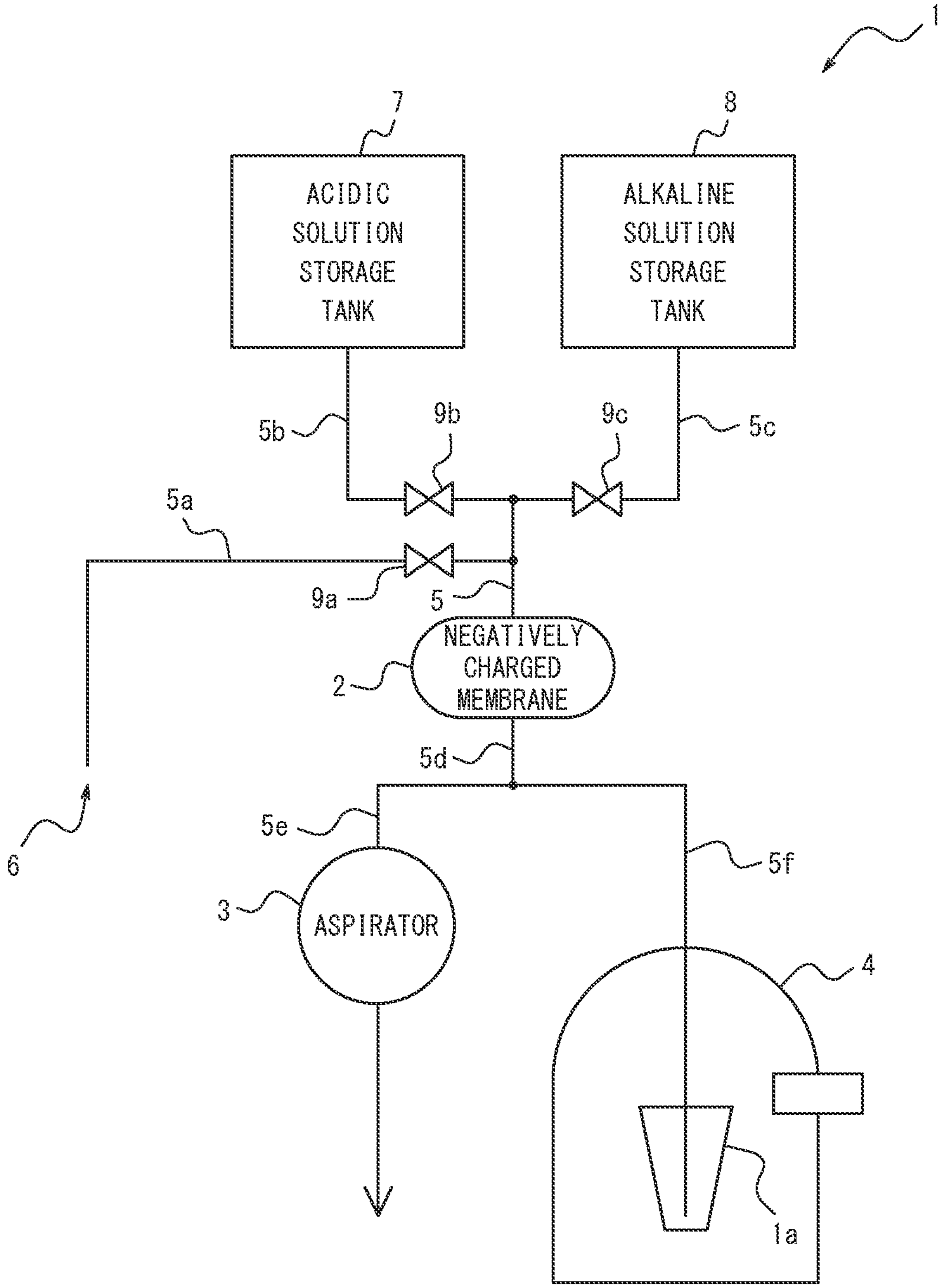
FIG. 8 is a schematic diagram for explanation of an example of equipment capable of performing processing by a negatively charged membrane method.

FIG. 8 is a schematic diagram for explanation of an example of equipment capable of performing processing by the negatively charged membrane method. As illustrated in FIG. 8, equipment 1 includes a negatively charged membrane 2, an aspirator 3, and a suction bottle 4. In FIG. 8, solid lines joining each component indicate piping through which fluid flows.

The negatively charged membrane 2 is a negatively charged membrane. For example, a mixed cellulose membrane manufactured by Millipore Corporation (hereinafter also referred to simply as "HA membrane") may be used. The negatively charged membrane 2 has pores able to capture viruses and allow molecules that make up a fluid, such as water molecules, to pass through. The pore diameter of the pores in the negatively charged membrane 2 may be determined according to the virus to be captured by the negatively charged membrane 2.

A pipe 5 is provided upstream of the negatively charged membrane 2 to supply fluid. As illustrated in FIG. 8, three different pipes, a first pipe 5*a*, a second pipe 5*b*, and a third pipe 5*c* are connected to the pipe 5. Each of the three pipes, the first pipe Sa, the second pipe 5*b*, and the third pipe 5*c*, supply different fluids to the negatively charged membrane 2 via the pipe 5.

The first pipe 5*a* connects the pipe 5 to a sample water supply port 6. From the sample water supply port 6, sample water that may contain a virus is supplied to the first pipe 5*a*. The sample water supply port 6 may be supplied with a defined solution mixed with sample water taken from a water treatment infrastructure facility. The defined solution may be, for example, a magnesium chloride solution. As the defined solution, an appropriate solution may be used depending on properties of the sample water. The defined solution need not be used, depending on the properties of the sample water. The second pipe 5*b* connects the pipe 5 to an acidic solution storage tank 7 where an acidic aqueous solution is stored. The acidic aqueous solution is supplied to the second pipe 5*b* from the acidic solution storage tank 7. The acidic aqueous solution is described herein as a sulfuric acid solution, but is not limited to this example.

The third pipe 5*c* connects the pipe 5 to an alkaline solution storage tank 8 where an alkaline aqueous solution is stored. The alkaline aqueous solution is supplied to the third pipe 5*c* from the alkaline solution storage tank 8. The alkaline aqueous solution is described herein as a sodium hydroxide aqueous solution, but is not limited to this example.

The three pipes connected to the pipe 5, the first pipe 5*a*, the second pipe 5*b*, and the third pipe 5*c*, are provided with a valve 9*a*, a valve 9*b*, and a valve 9*c*, respectively. Opening and closing of the valves 9*a*, 9*b*, and 9*c* controls supply of fluid from the three pipes, the first pipe 5*a*, the second pipe 5*b*, and the third pipes 5*c*, respectively, to the negatively charged membrane 2. Only one of the sample water, the acidic aqueous solution, and the alkaline aqueous solution is supplied to the negatively charged membrane 2 at a given time. The valves 9*a*, 9*b*, and 9*c* are opened and closed so that two or more of the sample water, the acidic aqueous solution, and the alkaline aqueous solution are not supplied at the same time.

The aspirator 3 is disposed downstream of the negatively charged membrane 2. The aspirator 3 draws in the fluid supplied to the negatively charged membrane 2 by creating a reduced pressure condition. For example, in cases where the sample water and the acidic aqueous solution are supplied to the negatively charged membrane 2, the aspirator 3 is driven and fluid is drawn into the aspirator 3 and discharged externally.

The suction bottle 4 is disposed downstream of the negatively charged membrane 2 and in parallel with the aspirator 3. The suction bottle 4 draws in the fluid supplied to the negatively charged membrane 2 by creating a reduced pressure condition and collects the fluid in a concentrate collection container 1*a* provided internally. For example, when the alkaline aqueous solution is supplied to the negatively charged membrane 2, the fluid is drawn into the suction bottle 4 and collected in the concentrate collection container 1*a*.

The following is a description of a processing method according to the negatively charged film method using the equipment 1 illustrated in FIG. 8.

Figure 9:
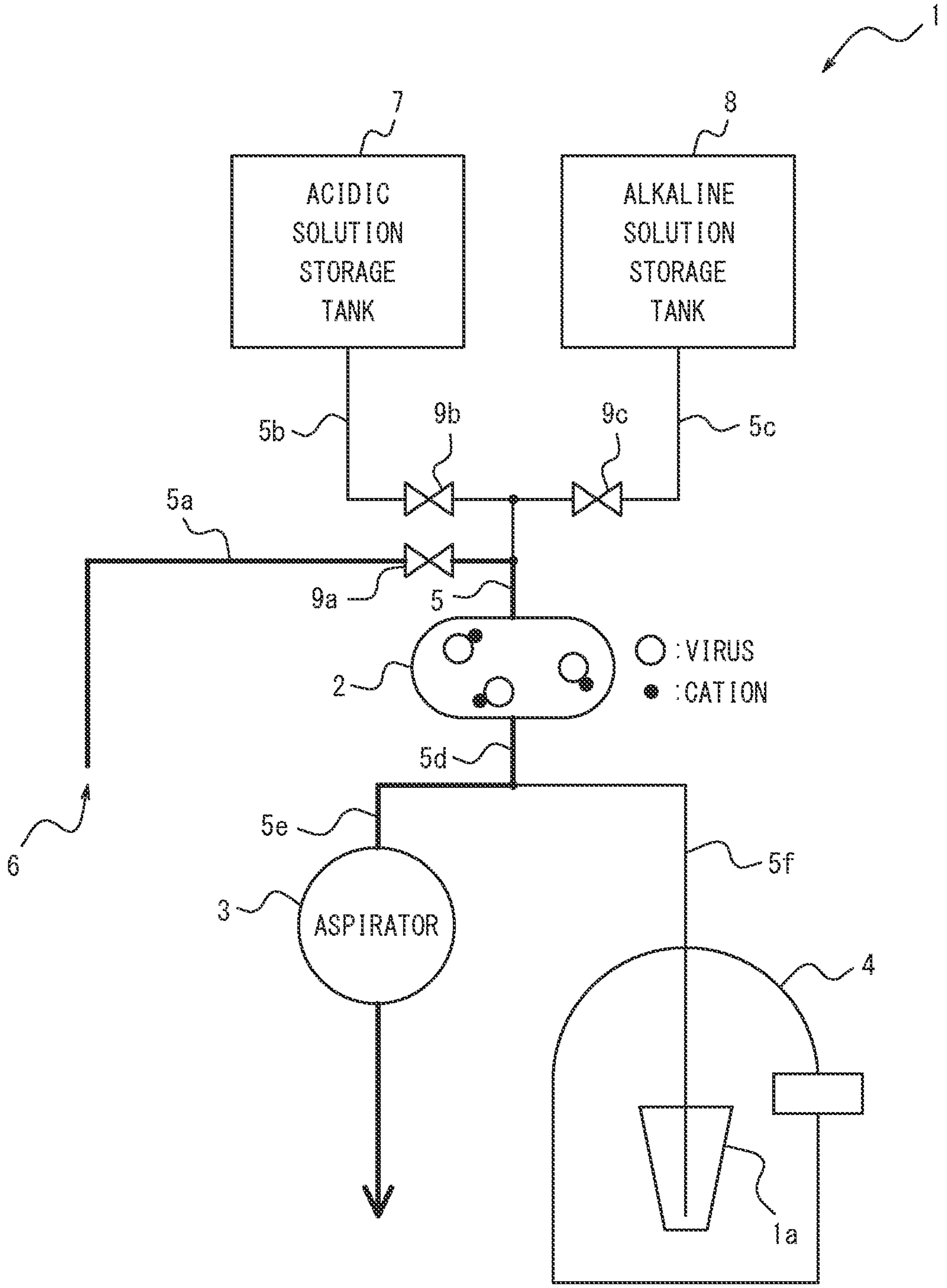
FIG. 9 is a first schematic diagram for explanation of processing steps of the negatively charged membrane method performed via the equipment illustrated in FIG. 8.

FIG. 9 is a first schematic diagram for explanation of processing steps of the negatively charged membrane method performed via the equipment 1 illustrated in FIG. 8. Bold lines in FIG. 9 indicate fluid flow.

The valve 9*a* of the first pipe 5*a* is opened and the aspirator 3 is driven to supply sample water from the sample water supply port 6 to the negatively charged membrane 2 via the first pipe 5*a* and the pipe 5. As the sample water passes through the negatively charged membrane 2, cations in the sample water have a positive charge and are therefore captured by the negatively charged membrane 2. Viruses in the sample water are negatively charged and therefore captured by the cations. As the negatively charged membrane 2, one capable of capturing viruses at this time is used. For example, an HA membrane having a pore size of 0.45 μm and a diameter of 13 mm to 90 mm may be used as the negatively charged membrane 2. The sample water with captured cations and viruses is drained by the aspirator 3 through a pipe 5*d* and a pipe 5*e* disposed downstream of the negatively charged membrane 2.

Figure 10:
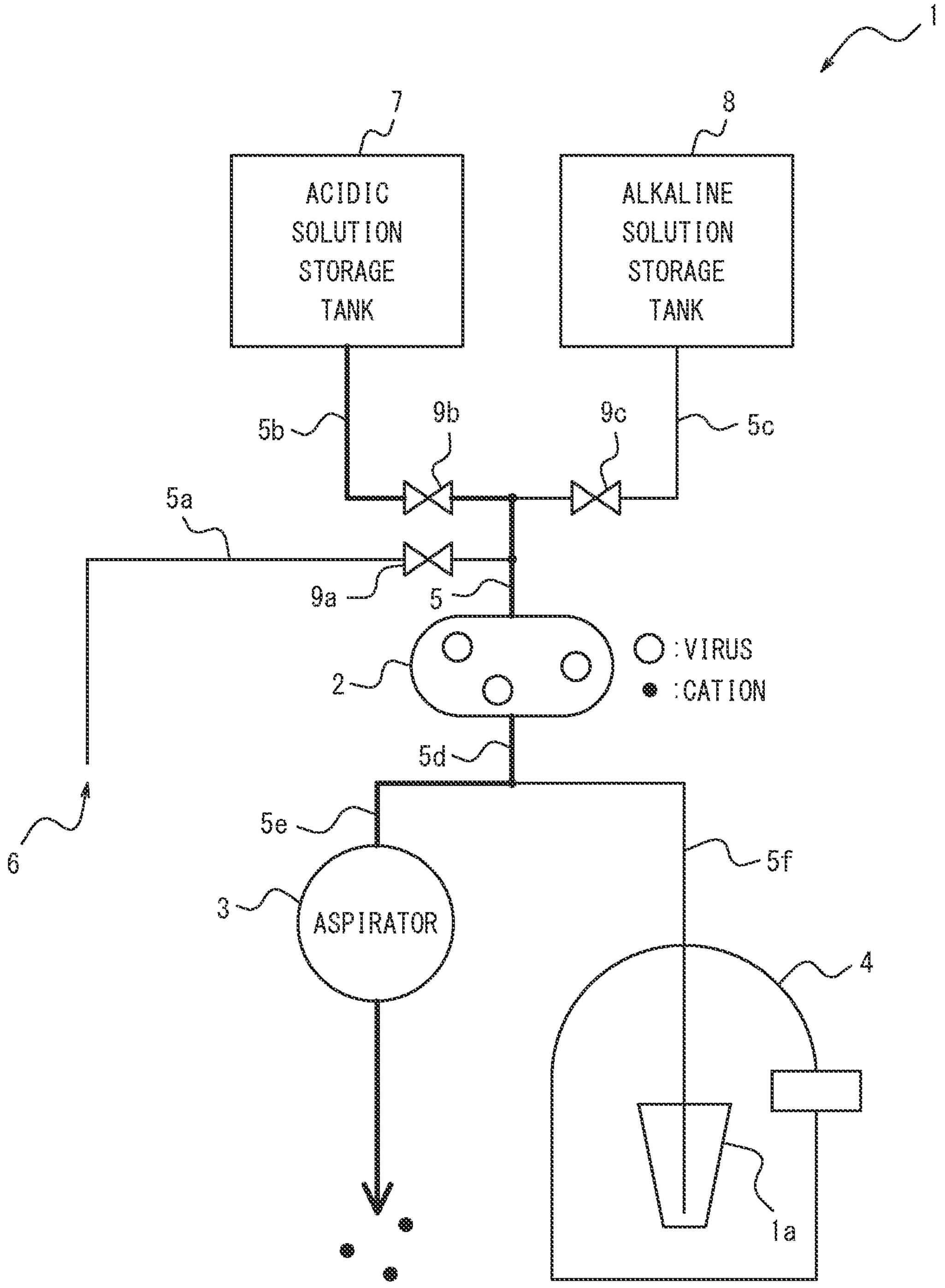
FIG. 10 is a second schematic diagram for explanation of processing steps of the negatively charged membrane method performed via the equipment illustrated in FIG. 8.

FIG. 10 is a second schematic diagram for explanation of processing steps of the negatively charged membrane method performed via the equipment 1 illustrated in FIG. 8. Bold lines in FIG. 10 indicate fluid flow.

After the valve 9*a* of the first pipe 5*a* is closed, the valve 9*b* of the second pipe 5*b* is opened and the aspirator 3 is driven to supply the sulfuric acid solution from the acidic solution storage tank 7 to the negatively charged membrane 2. This results in acid cleaning of the negatively charged membrane 2. In other words, by supplying the sulfuric acid solution to the negatively charged membrane 2 and flowing downstream via the aspirator 3, the cations captured in the negatively charged membrane 2 are stripped from the negatively charged membrane 2 and drained with the sulfuric acid solution through the pipe 5*d* and the pipe 5*e*. The sulfuric acid solution may be any acid washing solution, for example 0.5 mM sulfuric acid solution at pH 3.0. The sulfuric acid solution may be supplied in an appropriate volume, for example, one-tenth the volume of the supplied sample water. The sulfuric acid solution may be supplied in an appropriate volume, for example 10 ml or more. Acid washing leaves the negatively charged membrane 2 with viruses adhering thereto.

Figure 11:
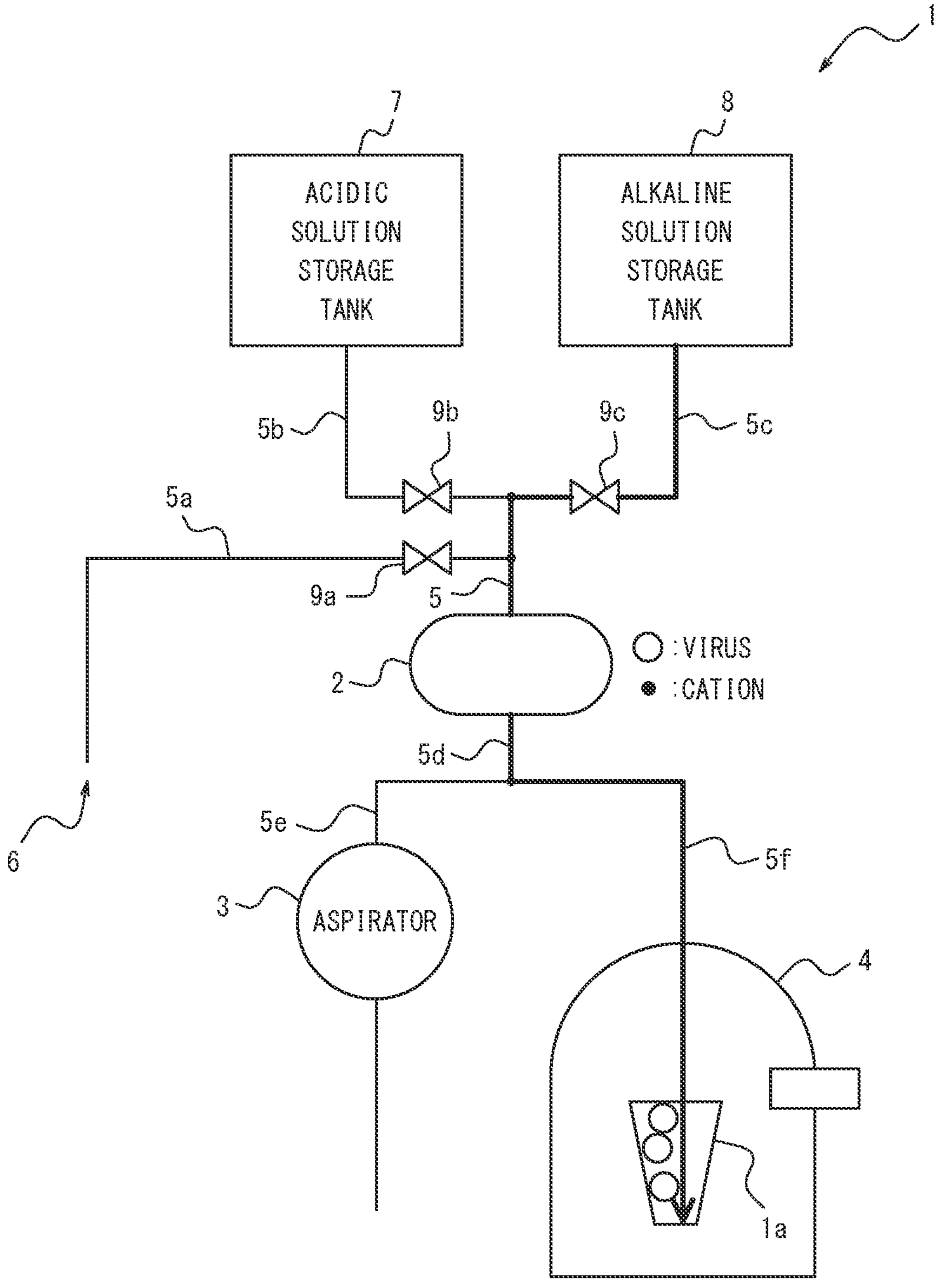
FIG. 11 is a third schematic diagram for explanation of processing steps of the negatively charged membrane method performed via the equipment illustrated in FIG. 8.

FIG. 11 is a third schematic diagram for explanation of processing steps of the negatively charged membrane method performed via the equipment 1 illustrated in FIG. 8. Bold lines in FIG. 11 indicate fluid flow.

After the valve 9*b* of the second pipe 5*b* is closed, the valve 9*c* of the third pipe 5*c* is opened, the aspirator 3 is stopped, and the suction bottle 4 is driven, thereby supplying the sodium hydroxide aqueous solution from the alkaline solution storage tank S to the negatively charged membrane 2. As a result, the negatively charged virus captured by the negatively charged membrane 2 is stripped from the negatively charged membrane 2 and flows with the sodium hydroxide aqueous solution through the pipe 5*d* and the pipe 5*e* to the suction bottle 4 and is collected in the concentrate collection container 1*a*. The sodium hydroxide aqueous solution may be any solution from which viruses may be recovered, for example, a 1.0 mM sodium hydroxide aqueous solution at pH 10.5 to pH 10.8. The sodium hydroxide aqueous solution may be supplied in an appropriate volume, for example, 1 ml to 10 ml.

The concentrate collection container 1*a* may be pre-filled with a solution to neutralize the sodium hydroxide aqueous solution from which the virus is collected. For example, the concentrate collection container 1*a* may be pre-filled with 5 μl to 50 μl of 0.2 N sulfuric acid solution and 10 μl to 100 μl of pH 8.0 buffer solution.

Thus, the processing described with reference to FIG. 9 through FIG. 11 may purify a virus in the sample water into the concentrate collection container 1*a* by performance of the negatively charged membrane method via the equipment 1.

Concentrates of microorganisms purified using the negatively charged membrane method such as described above are collected and used in PCR based assays for qualitative or quantitative measurement of microorganisms in aquatic environments. During a microbial concentration process to purify the concentrate, inhibitors that may inhibit PCR and result in inaccurate quantification of microbial measurements are also concentrated. For example, there are known conventional methods that provide more accurate quantification by removing inhibitors concentrated in the microbial concentration process.

However, in water treatment infrastructure, including, for example, water purification plants, sewage treatment plants, water reclamation facilities, and desalination plants, the amount of an inhibitor in processed water may vary widely within a day or on different days. In water treatment processes that are designed to remove inhibitors, the removal process may be performed excessively even when the inhibitor removal process is not absolutely necessary. This has resulted in unnecessary costs. In addition, unnecessary costs resulted from the use of excessive reagents in the removal process. In addition, the amount of an inhibitor in processed water may vary widely, and removal effectiveness might not be improved unless the removal method is optimized according to the amount of an inhibitor in the removal process.

The following describes a water treatment method, a control apparatus 10, and a water treatment system 100 able to solve these problems.

Embodiment 1

Figure 1:
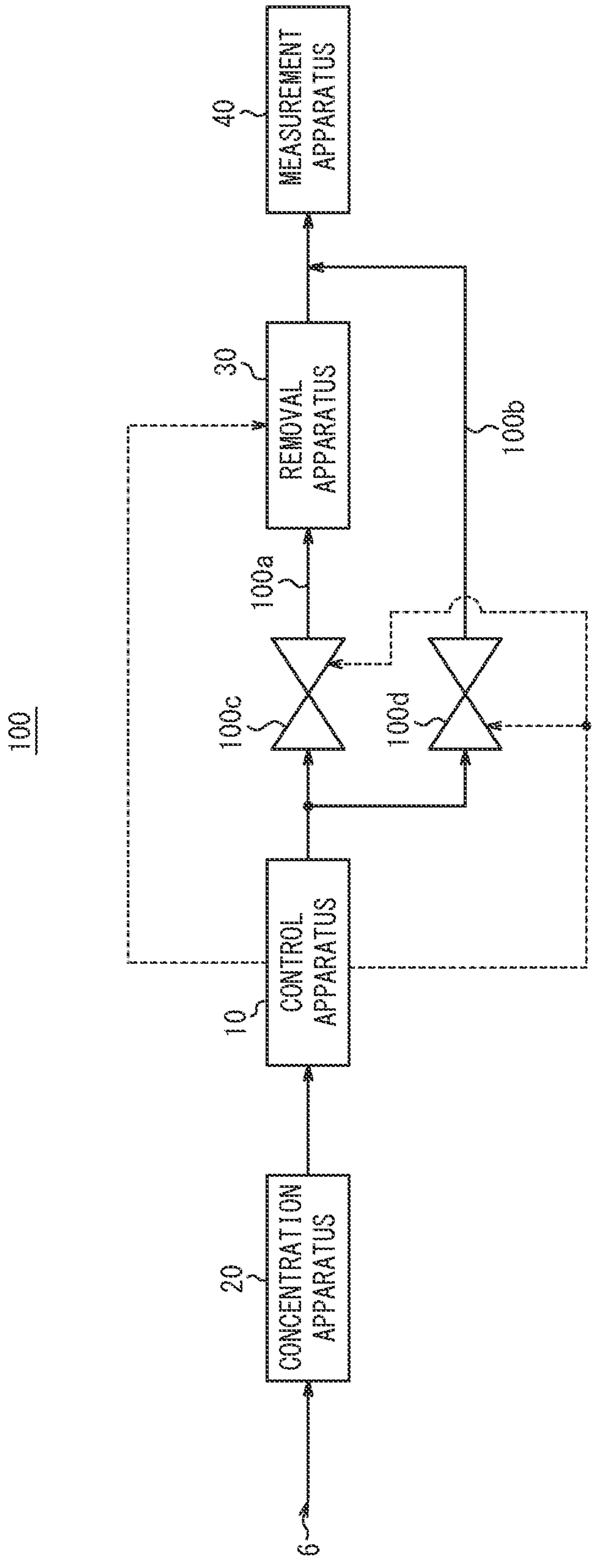
FIG. 1 is a schematic diagram of a water treatment system according to Embodiment 1 of the present disclosure.

FIG. 1 is a schematic diagram of the water treatment system 100 according to Embodiment 1 of the present disclosure. Configuration and functions of the water treatment system 100 according to Embodiment 1 are described with reference to FIG. 1. In FIG. 1, solid arrows connecting components indicate fluid flow. Dashed arrows starting from the control apparatus 10 indicate flow of signals.

The water treatment system 100 includes the control apparatus 10 that controls the water treatment process in the water treatment system 100. The water treatment system 100 includes a concentration apparatus 20 that concentrates microorganisms in sample water to purify a concentrate, a removal apparatus 30 that removes an inhibitor from the concentrate purified by the concentration apparatus 20, and a measurement apparatus 40 that measures microorganisms in the concentrate. Hereinafter, “inhibitor” includes, for example, humin-like substances.

In Embodiment 1, the control apparatus 10 is disposed downstream of the concentration apparatus 20. From upstream to downstream, each apparatus is arranged in the following order: the concentration apparatus 20, the control apparatus 10, the removal apparatus 30, and the measurement apparatus 40. In the water treatment system 100, fluid flow splits into two, a first path 100*a* and a second path 100*b*, between the control apparatus 10 and the measurement apparatus 40, and the two flows merge again. The water treatment system 100 includes a first solenoid valve 100*c* disposed between the control apparatus 10 and the removal apparatus 30 on the first path 100*a* and a second solenoid valve 100*d* disposed between the control apparatus 10 and the measurement apparatus 40 on the second path 100*b*.

The concentration apparatus 20 may be configured based on the equipment 1 described with reference to FIG. 8 through FIG. 1L The concentration apparatus 20, for example, concentrates microorganisms in sample water obtained from the sample water supply port 6 to purify a concentrate.

Figure 2:
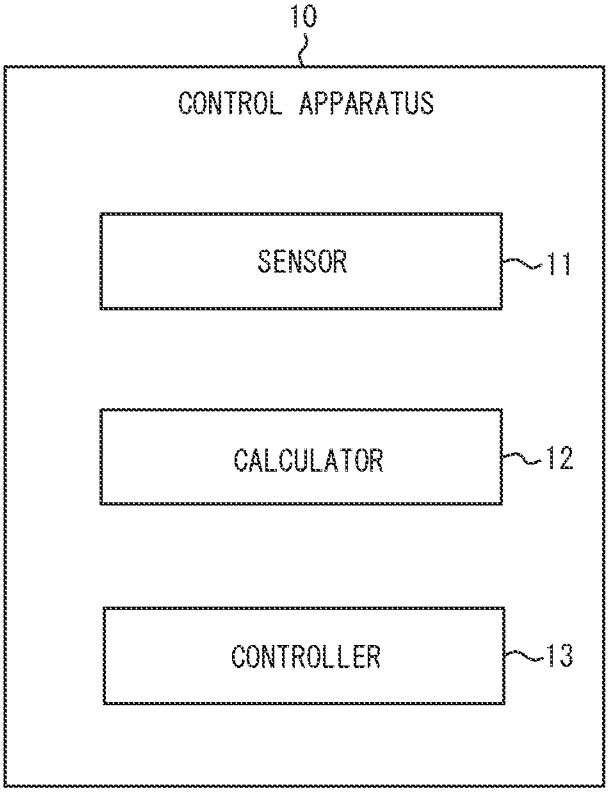
FIG. 2 is a functional block diagram illustrating a schematic configuration of the control apparatus illustrated in FIG. 1.

FIG. 2 is a functional block diagram illustrating a schematic configuration of the control apparatus 10 illustrated in FIG. 1. Configuration and functions of the control apparatus 10 illustrated in FIG. 1 are described with reference to FIG. 2. The control apparatus 10 includes a sensor 11, a calculator 12, and a controller 13.

The sensor 11 detects an inhibitor contained in the concentrate purified by concentrating microorganisms in sample water by the concentration apparatus 20. For example, a detection target of the sensor 11 is at least a portion of the concentrate collected by the concentrate collection container 1*a* of the concentration apparatus 20 as a sample. The sensor 11 includes, for example, any sensor element, sensor module, or sensor apparatus capable of detecting an inhibitor. The sensor 11 outputs the presence or absence of detection of the inhibitor as a detection signal to the controller 13. Without being limited to this, the sensor 11 may output information to the calculator 12 as a detection signal, which is necessary for the calculator 12 to calculate an index value of the inhibitor as described below.

The calculator 12 calculates the index value of the inhibitor based on the detection signal output by the sensor 11. The calculator 12 includes any calculation element or calculation module capable of calculating the index value of the inhibitor. Hereinafter, “index value of the inhibitor” includes, for example, the amount of the inhibitor. When the inhibitor is a humin-like substance, methods for quantitatively measuring the humin-like substance as the index value of the inhibitor include, for example, elemental analysis, infrared absorption spectroscopy, ultraviolet/visible absorption analysis, fluorescence analysis, size exclusion chromatography, nuclear magnetic resonance (NMR) analysis, and the like.

The index value for the inhibitor may include, instead of or in addition to direct values such as the amount of the inhibitor, indirect values of the sample such as flow cytometer particles, turbidity, chromaticity, chemical oxygen demand (COD), biochemical oxygen demand (BOD), total organic carbon (TOC), dissolved oxygen (DO), suspended solids (SS), chlorophyll concentration, total nitrogen (T-N), total phosphorus (T-P), organic pollutant concentration (ultraviolet absorption analysis), adenosine triphosphate (ATP), and the like.

For example, when the index value of the inhibitor includes flow cytometer particles, the sensor 11 includes a flow imaging device. For example, when the index value of the inhibitor includes turbidity, the sensor 11 includes a nephelometric turbidity sensor, a light absorption sensor, and the like. For example, when the index value of the inhibitor includes chromaticity, the sensor 11 includes a transmitted light chromaticity meter. For example, when the index value of the inhibitor includes COD, the sensor 11 includes a COD analyzer. For example, when the index value of the inhibitor includes BOD, the sensor 11 includes a BOD meter, a biosensor-type rapid BOD meter, and the like.

For example, when the index value of the inhibitor includes TOC, the sensor 11 includes a TOC meter. For example, when the index value of the inhibitor includes DO, the sensor 11 includes an optical DO meter. For example, when the index value of the inhibitor includes SS, the sensor 11 includes a backscattered light or transmitted light SS sensor. For example, when the index value of the inhibitor includes chlorophyll concentration, the sensor 11 includes a chlorophyll fluorescence sensor. For example, when the index value of the inhibitor includes T-N, the sensor 11 includes devices based on an ultraviolet method, a hydrazine sulfate reduction method, a copper-cadmium reduction method, and the like, as well as automatic quantification devices and the like.

For example, when the index value of the inhibitor includes T-P, the sensor 11 includes devices based on a heat concentration method, a solvent extraction method, and the like, as well as automatic quantification devices and the like. For example, when the index value of the inhibitor includes organic pollutant concentration (ultraviolet absorption analysis), the sensor 11 includes an ultraviolet meter. For example, when the index value of the inhibitor includes ATP, the sensor 11 includes an ATP meter.

The controller 13 includes at least one processor. According to an embodiment, a "processor" may be, but is not limited to, a general-purpose processor or a dedicated processor specialized for particular processing. The controller 13 is communicatively connected to each component of the control apparatus 10 and controls the overall operation of the control apparatus 10. The controller 13 determines whether or not to remove the inhibitor from the concentrate based on the detection results from the sensor 11.

For example, the controller 13 may determine whether or not to remove the inhibitor from the concentrate by determining whether or not the inhibitor is detected based on a detection signal indicating whether or not the inhibitor is detected that is directly obtained from the sensor 11. For example, the controller 13 may determine that the inhibitor is to be removed from the concentrate by determining that the inhibitor has been detected.

For example, the controller 13 may determine whether or not to remove the inhibitor from the concentrate by determining whether or not the index value of the inhibitor calculated by the calculator 12 has reached a threshold value. For example, the controller 13 may determine that the inhibitor is to be removed from the concentrate by determining that the index value of the inhibitor has reached the threshold value.

The controller 13 may require measurement of the inhibitor at a timing matched to sampling, and may perform constant monitoring in real time or continuous monitoring with a measurement time of several minutes to several hours. The controller 13 may determine at each sampling whether the inhibitor needs to be removed through continuous monitoring. The controller 13 may determine whether the inhibitor needs to be removed based on variation within a day, daily variation, weekly variation, monthly variation, seasonal variation, and the like through continuous monitoring.

The threshold value of the index value of the inhibitor, which is a criterion for determining to remove the inhibitor, may be set differently for each treatment facility of water treatment infrastructure. For example, in the case of an existing treatment facility and the index value of the inhibitor is something other than the amount of the inhibitor, the correlation between a reference value of the index value of the inhibitor obtained during system operation and the amount of the inhibitor may be calculated, and the index value of the inhibitor with the highest correlation may be selected for the threshold value. For example, in the case of an existing treatment facility, the average value of variation within a day, daily variation, weekly variation, monthly variation, seasonal variation, and the like may be calculated in advance from the index value of the inhibitor obtained during the operation of the system, and the threshold value may be set from a value of variation from the average value.

For the value of variation, the average value and standard deviation Ca of variation within a day, daily variation, weekly variation, monthly variation, seasonal variation, and the like may be calculated in advance from the index value of the inhibitor obtained during the operation of the system, a confidence interval for the average value may be set from the standard deviation, and a value exceeding the confidence interval may be regarded as having a significant difference and set as the threshold value. For the value of variation, the average value and standard deviation a of variation within a day, daily variation, weekly variation, monthly variation, seasonal variation, and the like may be calculated in advance from a logarithm of the index value of the inhibitor obtained during the operation of the system, a confidence interval for the average value may be set from the standard deviation, and a value exceeding the confidence interval may be regarded as having a significant difference and set as the threshold value.

The confidence interval may be set arbitrarily, but when a value outside 95% of the average value is considered an outlier, the confidence interval is set based on the average value plus 1.96 ca. When a value outside 99% of the average value is considered an outlier, the confidence interval is set based on the average value plus 2.33 $\sigma$.

The threshold value may be set from an empirical value indicating a high value for an environmental factor such as rainfall conditions without being set as a confidence interval. The above value of variation may be incorporated into machine learning or the like so that the index value of the inhibitor obtained while the system is in operation is always fed back into calculation of the threshold value. The threshold value need not be a threshold value for a single index value, and may be based on results obtained from multivariate analysis, such as principal component regression analysis and classification of a plurality of index values, neural networks, machine learning, and the like. Also in this case, data may be constantly fed back into the calculation of the threshold value.

Otherwise, the threshold value may be set using a statistical method of outlier detection, including the Smirnov-Grubbs test for testing outliers, the use of interquartile ranges, and the like.

When the controller 13 determines that the inhibitor is to be removed from the concentrate, the controller 13 controls a water treatment process in the water treatment system 100 so that the concentrate passes through the removal apparatus 30 before the microorganisms are measured by the measurement apparatus 40. For example, referring to FIG. 1, the two solenoid valves, the first solenoid valve 100*c* and the second solenoid valve 100*d*, are closed beforehand. When the controller 13 determines that the inhibitor is to be removed from the concentrate, the controller 13 outputs a control signal to the first solenoid valve 100*c* to open the first solenoid valve 100*c*. Accordingly, the second solenoid valve 100*d* remains closed and the first solenoid valve 100*c* opens. On the other hand, when the controller 13 determines that the inhibitor is not to be removed from the concentrate, the controller 13 outputs a control signal to the second solenoid valve 100*d* to open the second solenoid valve 100*d*. Accordingly, the first solenoid valve 100*c* remains closed and the second solenoid valve 100*d* opens.

The controller 13 may output information about the index value of the inhibitor calculated by the calculator 12 to the removal apparatus 30 in order to optimize the removal method by which the removal apparatus 30 removes the inhibitor from the concentrate according to the index value of the inhibitor, Without being limited to this, the controller 13 may output a control signal to the removal apparatus 30 to optimize the removal method according to the index value of the inhibitor calculated by the calculator 12.

The removal apparatus 30 includes any apparatus capable of removing the inhibitor from the concentrate purified by the concentration apparatus 20. In the removal apparatus 30, for example, when the inhibitor is a humin-like substance, removal methods using anion exchange resins, gel filtration, ferrihydrite, a hydrophobic resin (for example, DAX-8), and the like may be used for removal.

Removal of the humin-like substance using anion exchange resins is performed by mixing strong and weak anion exchange resins with a certain amount of the sample, incubating at room temperature, and collecting the filtrate after treatment by a centrifugal filtration unit. The humin-like substance is adsorbed on anion exchange resins and the inhibitor is removed by filters and the like of the filtration unit.

Removal of the humin-like substance using gel filtration is performed by treating the sample with a centrifugal gel filtration unit and collecting the filtrate. Size exclusion between the target microorganism and the humin-like substance removes the inhibitor.

Removal of the humin-like substance using ferrihydrite is performed by mixing ferrihydrite with a certain amount of the sample, incubating at room temperature, and treatment with a centrifugal filtration unit to collect the filtrate. Ferrihydrite is used as a flocculant for the humin-like substance and the inhibitor is removed by filters and the like of the filtration unit.

Removal of the humin-like substance using a hydrophobic resin (DAX-8) is performed by mixing the hydrophobic resin (DAX-8) with a certain amount of the sample, incubating at room temperature, and collecting the filtrate after treatment by a centrifugal filtration unit. To recover microorganisms remaining in the resin, an appropriate dissolution buffer may be used on the resin after treatment and the microorganisms recovered by reusing the centrifugal filtration unit. The humin-like substance is adsorbed on hydrophobic resin (DAX-8) and the inhibitor is removed by filters and the like of the filtration unit.

In the removal apparatus 30, any one of the above methods of removing the inhibitor may be repeated multiple times, or different methods may be performed in multiple steps. Although the removal apparatus 30 does not remove the effect on microorganisms of the extraction of biomolecules including nucleic acids, the method of removing the inhibitor may be performed after biomolecule extraction. The removal apparatus 30 may perform the method of removing the inhibitor once, perform biomolecule extraction from the sample, and then perform the method of removing the inhibitor again.

The measurement apparatus 40 includes any apparatus capable of measuring microorganisms in the concentrate. The measurement apparatus 40 is used for the detection of microorganisms in a microbial concentrate prepared by the concentration apparatus 20 or in a sample at a stage after removal of the inhibitor by the removal apparatus 30, and for qualitative and quantitative measurements. Methods used for detection of microorganisms and qualitative and quantitative measurements include culture methods, ATP measurement, catalase measurement, CO2 measurement, matrix assisted laser desorption ionization-time of flight mass spectrometry (MALDI-TOF MS), quantitative PCR (qPCR), loop-mediated isothermal amplification (LAMP) methods, deoxyribonucleic acid (DNA) base sequence analysis, DNA microarray methods, immunochromatography methods, capillary electrophoresis, staining methods, fluorescence methods, enzymatic methods, electrical impedance methods, microcolony detection methods, and the like.

The measurement apparatus 40 may perform a method such as a labeled antibody method. The measurement apparatus 40 may, for example, perform fluorescence in situ hybridization (FISH), a fluorometric measurement of the expression of a specific chromosome or gene in a tissue or cell using a fluorescent substance. The measurement apparatus 40 may perform a method such as fluorescence immunoassay (FIA) methods that measure antigen-antibody reactions using a fluorescent substance such as europium as a label, indirect fluorescent antibody (IFA) methods that measure reactions of serum (antibody) labeled with a fluorescent substance, such as a pathogen as an antigen, enzyme-linked immunosorbent assay (ELISA) methods, latex agglutination methods, antibody titration, and the like.

For example, when the inhibitor is a humin-like substance, qPCR and LAMP are two measurement methods that are likely to inhibit enzymatic reaction of the humin-like substance. Inhibition of ribonucleic (RNA) reverse transcription reaction, which is the start of gene amplification in the qPCR and LAMP methods, is also considered to have a significant effect. The humin-like substance may also cause artifacts in nucleic acid extraction, separation of RNA into hydrophilic and other fractions, protein removal, and the like.

Figure 3:
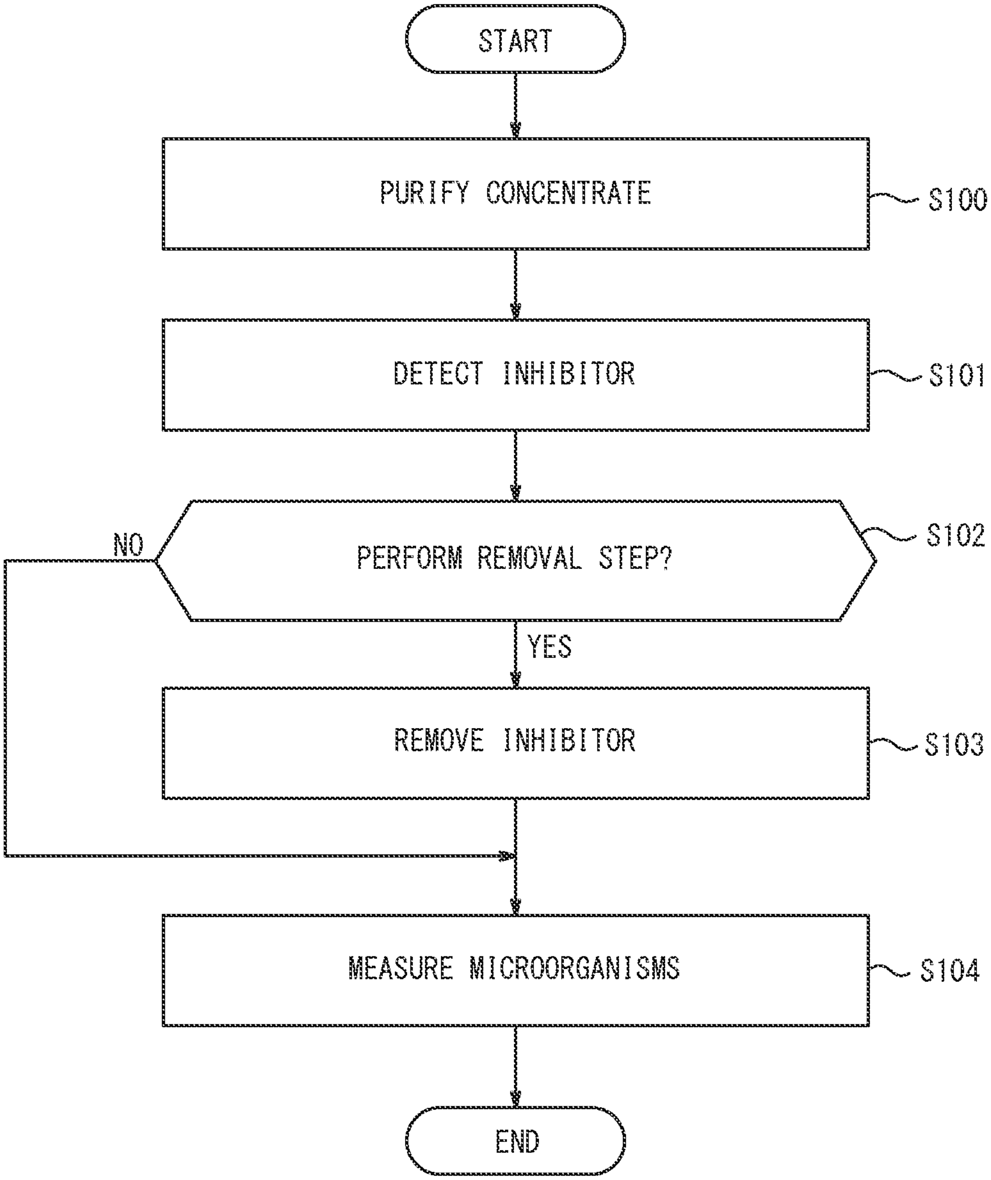
FIG. 3 is a flowchart for explanation of a water treatment method according to Embodiment 1 of the present disclosure.

FIG. 3 is a flowchart for explanation of the water treatment method according to Embodiment 1 of the present disclosure. The water treatment method according to Embodiment 1, performed using the water treatment system 100 illustrated in FIG. 1, is described with reference to FIG. 3.

In step S100, the concentration apparatus 20 performs the concentration step of concentrating the microorganisms in the sample water to purify the concentrate.

In step S101, the control apparatus 10 performs the detection step of detecting the inhibitor in the concentrate purified in step S100.

In step S102, the control apparatus 10 performs the determination step of determining whether or not to perform the removal step based on the results of detection in the detection step of step S101. When the water treatment system 100 determines that the removal step is to be performed in step S102, step S103 is performed. When the water treatment system 100 determines that the removal step is not to be performed in step S102, step S104 is performed.

In step S103, the removal apparatus 30 performs the removal step of removing the inhibitor from the concentrate determined to be performed in the determination step of step S102.

In step S104, which is performed after the determination step of step S102 or the removal step of step S103, the measurement apparatus 40 performs the measurement step of measuring the microorganisms in the concentrate.

In the water treatment method according to Embodiment 1, the detection step by the control apparatus 10 is performed after the concentration step by the concentration apparatus 20. In the detection step, the inhibitor contained in the concentrate purified by the concentration apparatus 20 is detected.

In the determination step by the control apparatus 10, for example, the control apparatus 10 may determine whether or not the inhibitor is detected. The water treatment system 100 may perform the removal step upon determination that the inhibitor has been detected in such a determination step. In the determination step by the control apparatus 10, for example, the control apparatus 10 may determine whether the index value of the inhibitor has reached a preset threshold value. The water treatment system 100 may perform the removal step upon determination that the index value of the inhibitor has reached the threshold value in such a determination step.

In the removal step by the removal apparatus 30, the removal method for removing the inhibitor from the concentrate may be optimized according to the index value of the inhibitor. For example, the removal apparatus 30 may appropriately determine the conditions, such as the type, number, frequency, sequence, duration, and the like of the method to be performed in the removal method of removing the inhibitor described above, depending on the quantitative index value of the inhibitor. Without being limited to this, the removal apparatus 30 may appropriately determine the amount of reagent used in the removal method of removing the inhibitor according to the quantitative index value of the inhibitor.

According to Embodiment 1 described above, unnecessary costs in the water treatment process may be controlled. For example, the control apparatus 10 of the water treatment system 100 may control excessive performing of the removal step when the removal step of removing the inhibitor is not absolutely necessary, by performing the determination step described above. For example, the water treatment system 100 need not perform an unnecessary removal step that incurs a cost when the control apparatus 10 does not detect the inhibitor. For example, the water treatment system 100 need not perform an unnecessary removal step that incurs a cost when the control apparatus 10 determines that the index value of the inhibitor has not reached a predefined threshold value.

The control apparatus 10 of the water treatment system 100 is able to accurately determine whether or not to perform the removal step based on an accurately quantified objective index value by determining whether or not the index value of the inhibitor has reached the threshold value in the determination step described above. The water treatment system 100 may precisely switch between two different water treatment processes depending on the index value of the inhibitor. This improves the reliability of the water treatment system 100 as a system and improves convenience for users of the water treatment system 100.

The removal apparatus 30 of the water treatment system 100 may further control costs in the water treatment process by optimizing the removal method for removing the inhibitor from the concentrate according to the index value of the inhibitor in the removal step described above. For example, the removal apparatus 30 may reduce costs by changing the removal method depending on the amount of the inhibitor or by appropriately determining other conditions such as reagent amount. In addition, the reliability of the inhibitor removal effect is improved because the removal step is optimized according to the index value of the inhibitor monitored using the control apparatus 10. As a result, reliability of measurement in the subsequent microorganism measurement step is also improved.

By performing the detection step after the concentration step, the water treatment system 100 is able to directly determine the presence or absence of the inhibitor or the index value for the concentrate used in the subsequent microbial measurement step. The water treatment system 100 may perform the determination step via the control apparatus 10 described above based on a sample that directly reflects status of the inhibitor in the concentrate used in the subsequent microorganism measurement step.

The water treatment system 100 may dilute the sample to perform the detection step of detecting the inhibitor when the sample is scarce. The water treatment system 100 may, because the sample subjected to the detection step is also used in the later measurement step of measuring microorganisms, perform a non-contaminating inhibitor detection method in the detection step.

Embodiment 2

Figure 4:
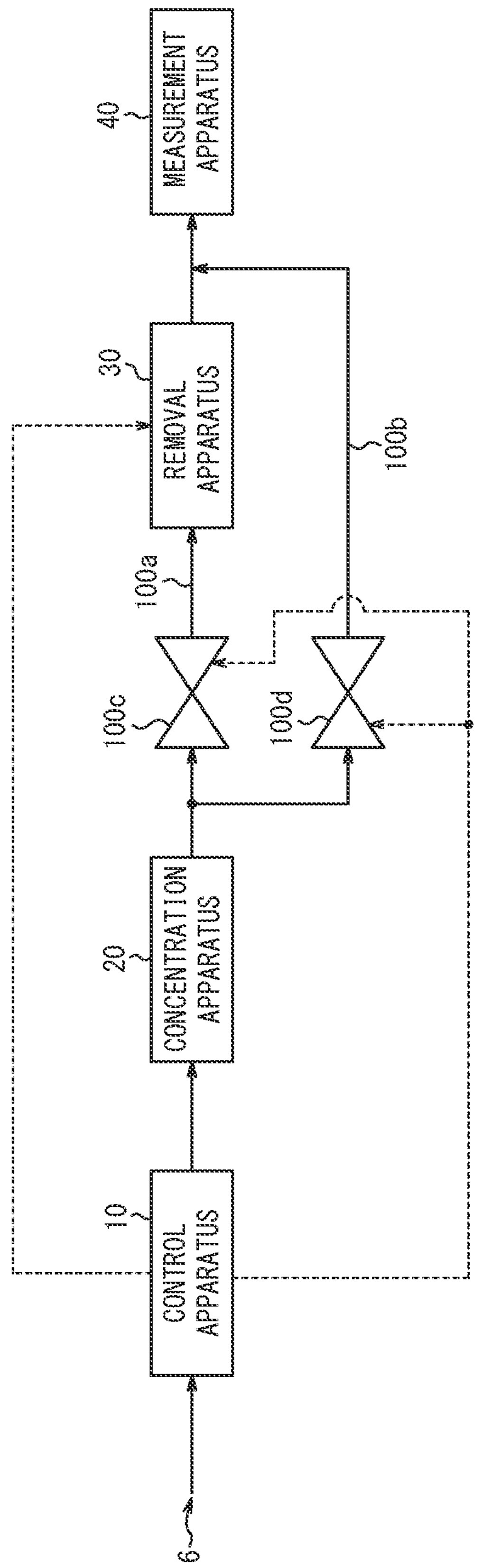
FIG. 4 is a schematic diagram of a water treatment system according to Embodiment 2 of the present disclosure.

FIG. 4 is a schematic diagram of the water treatment system 100 according to Embodiment 2 of the present disclosure. Configuration and functions of the water treatment system 100 according to Embodiment 2 are described with reference to FIG. 4. In FIG. 4, solid arrows connecting components indicate fluid flow. Dashed arrows starting from the control apparatus 10 indicate flow of signals.

The water treatment system 100 of Embodiment 2 differs from Embodiment 1 in that the control apparatus 10 is disposed upstream of the concentration apparatus 20. Other configurations, functions, effects, modifications, and the like are the same as in Embodiment 1, and the corresponding descriptions also apply to the water treatment system 100 according to Embodiment 2. In the following, the same symbols are used for the same components as in Embodiment 2, and descriptions thereof are not repeated. The main points that differ from Embodiment 1 are explained below.

In Embodiment 2, the control apparatus 10 is disposed upstream of the concentration apparatus 20. From upstream to downstream, each apparatus is arranged in the following order: the control apparatus 10, the concentration apparatus 20, the removal apparatus 30, and the measurement apparatus 40. The sensor 11 of the control apparatus 10 detects the inhibitor in the sample water before purification as a concentrate by the concentration apparatus 20. For example, a detection target of the sensor 11 is at least a portion of the sample water collected at the sample water supply port 6 as a sample.

Figure 5:
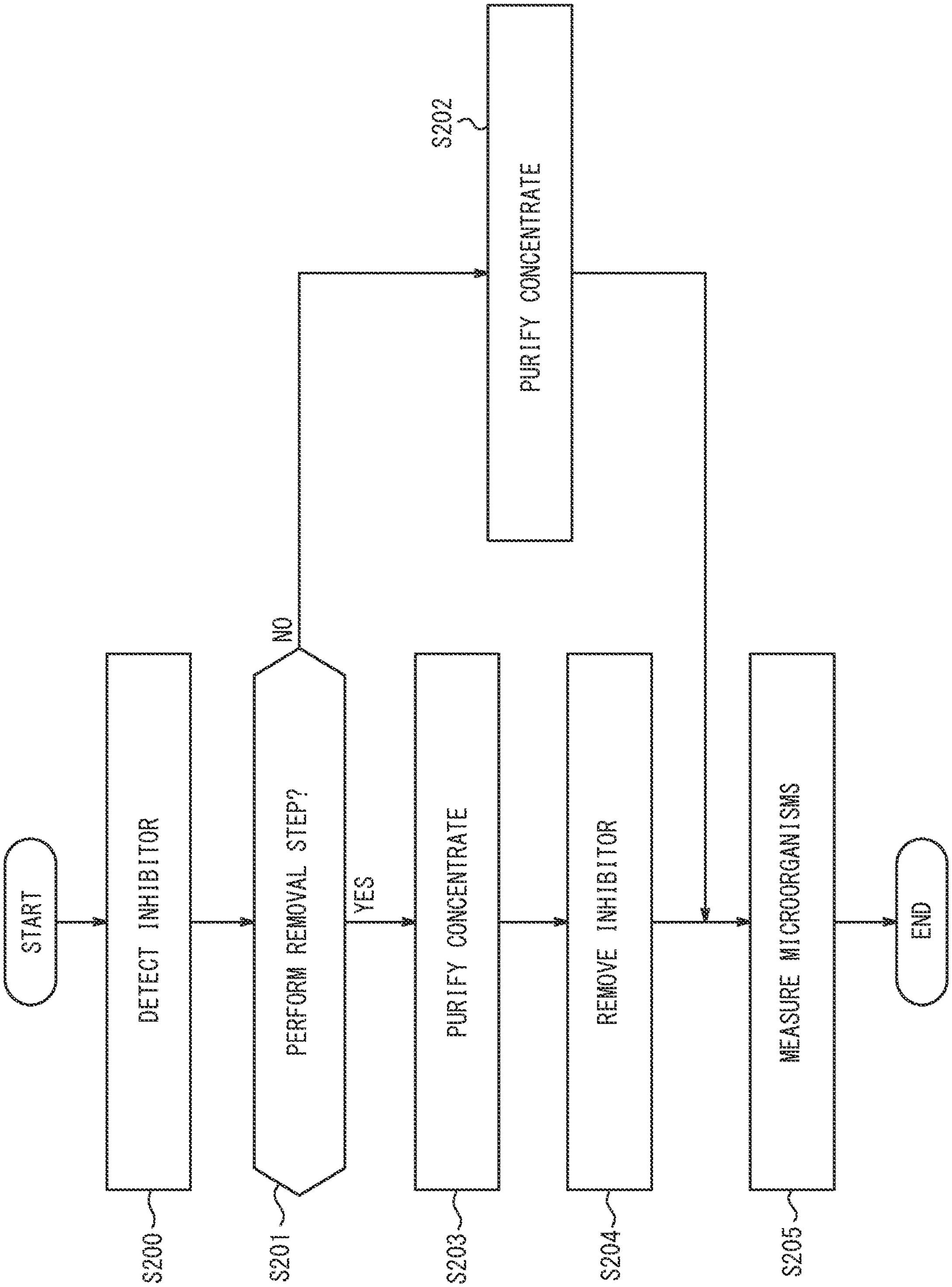
FIG. 5 is a flowchart for explanation of a water treatment method according to Embodiment 2 of the present disclosure.

FIG. 5 is a flowchart for explanation of a water treatment method according to Embodiment 2 of the present disclosure. The water treatment method according to Embodiment 2, performed using the water treatment system 100 illustrated in FIG. 4, is described with reference to FIG. 5.

In step S200, the control apparatus 10 performs the detection step of detecting the inhibitor in the sample water collected at the sample water supply port 6.

In step S201, the control apparatus 10 performs the determination step of determining whether or not to perform the removal step based on the results of detection in the detection step of step S200. When the water treatment system 100 determines that the removal step is to be performed in step S201, step S203 is performed. When the water treatment system 100 determines that the removal step is not to be performed in step S201, step S202 is performed.

In step S202, upon determining in step S201 that the removal step is not to be performed, the concentration step is performed by the concentration apparatus 20 to concentrate the microorganisms in the sample water collected in step S200 to purify the concentrate.

In step S203, upon determining in step S201 that the removal step is to be performed, the concentration step is performed by the concentration apparatus 20 to concentrate the microorganisms in the sample water collected in step S200 to purify the concentrate.

In step S204, the removal apparatus 30 performs the removal step of removing the inhibitor from the concentrate determined to be performed in the determination step of step S201.

In step S205, which is performed after the determination step of step S201, or more specifically after the concentration step of step S202 or the removal step of step S204, the measurement apparatus 40 performs the measurement step of measuring the microorganisms in the concentrate.

In the water treatment method according to Embodiment 2, the detection step by the control apparatus 10 is performed before the concentration step by the concentration apparatus 20. In the detection step, the inhibitor contained in the sample water collected at the sample water supply port 6 is detected.

According to Embodiment 2 described above, the same effects as in Embodiment 1 are achieved. On the other hand, the water treatment system 100 may use the sample before microbial concentration to detect the inhibitor by performing the detection step before the concentration step. This allows the water treatment system 100 to secure an ample sample amount, and a method of detecting the inhibitor that requires a large sample amount may be performed.

Further, the water treatment system 100 may calculate the index value of the inhibitor prior to microbial concentration, and therefore a rate of microbial concentration in the concentration step may be changed according to the index value of the inhibitor calculated. For example, when the index value of the inhibitor is not the amount of inhibitor and the correlation between the index value of the inhibitor and the amount of the inhibitor is high, the water treatment system 100 may estimate the effect of the amount of the inhibitor on the measurement of microorganisms when the rate of microbial concentration in the concentration step is reduced according to the index value of the inhibitor. This allows the water treatment system 100 to adjust the microbial concentration rate in the concentration step to reduce such effects. For example, when the index value of the inhibitor is not the amount of the inhibitor and the correlation between the index value of the inhibitor and the amount of microorganisms is high, the water treatment system 100 may estimate whether the amount of microorganisms falls below a detection limit of microbiological measurement when the concentration rate of microorganisms in the concentration step is reduced according to the index value of the inhibitor. This allows the water treatment system 100 to adjust the rate of microbial concentration in the concentration step so that the amount of microorganisms does not fall below such a lower detection limit.

Figure 6:
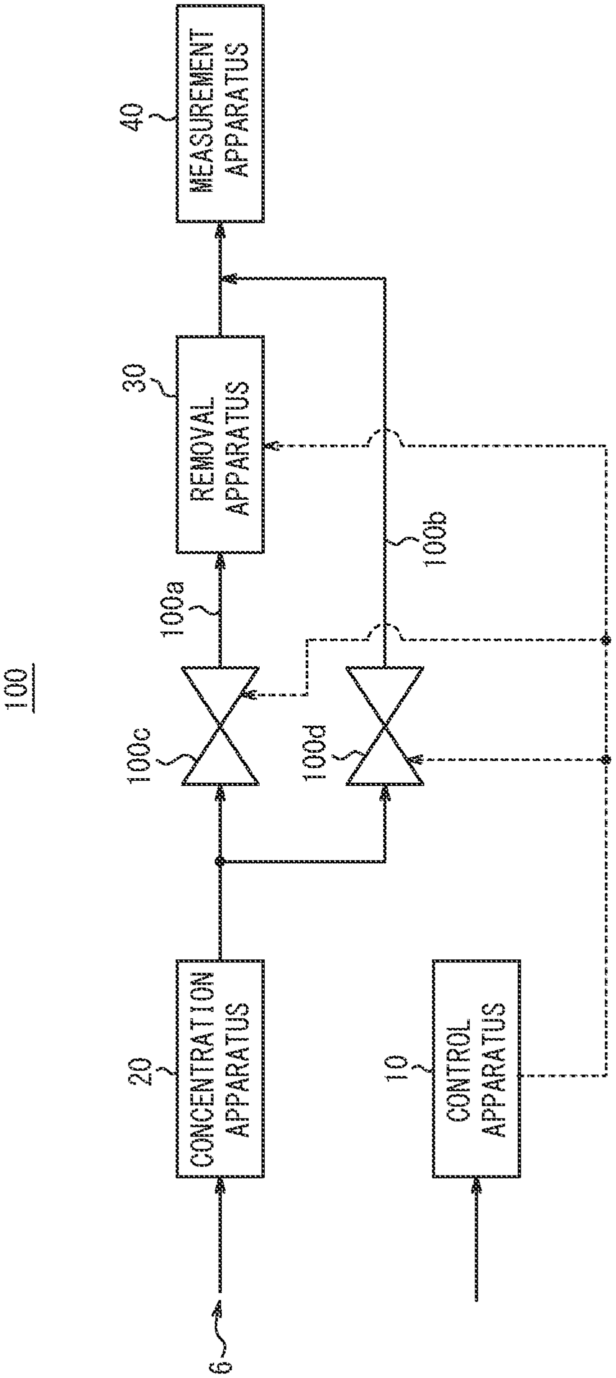
FIG. 6 is a schematic diagram of a modification of the water treatment system illustrated in FIG. 4.

FIG. 6 is a schematic diagram of a modification of the water treatment system 100 illustrated in FIG. 4. According to Embodiment 2, an explanation is given that sample water is collected at the sample water supply port 6, but this is not a limitation. A sample water sampling point used in the detection step by the control apparatus 10 may be upstream of the water treatment process in the water treatment infrastructure rather than the sample water supply port 6. For example, the sample water sampling point used in the detection step by the control apparatus 10 may be at a most upstream point of the water treatment process in the water treatment infrastructure. On the other hand, the sample water sampling point for use in the microbial measurement step may be downstream of each water treatment process in the water treatment infrastructure.

The index value of the inhibitor for each step of the water treatment process may be estimated based on the index value of the inhibitor at the most upstream water sampling point of the water treatment process in the water treatment infrastructure. Based on the index value of the inhibitor before and/or after each step or the entire process, a process for determining whether or not the removal step of removing the inhibitor is required or a process for optimizing the removal method may be performed.

Although the present disclosure has been described based on the drawings and examples, it should be noted that a person skilled in the art may make variations and modifications based on the present disclosure. Therefore, it should be noted that such variations and modifications are included within the scope of the present disclosure. For example, functions and the like included in each structure and step may be rearranged, and multiple structures and steps may be combined into one or divided, as long as no logical inconsistency results.

For example, the present disclosure may be realized as a program describing the processing content to realize each function of the water treatment system 100 described above, or as a storage medium on which the program is stored. The scope of the present disclosure should be understood to include these examples.

For example, the shape, arrangement, orientation, and number of each of the above components are not limited to those illustrated in the above description and drawings. The shape, arrangement, orientation, and number of each component may be configured arbitrarily, as long as the function thereof is achievable.

For example, according to an embodiment described above, as illustrated in FIG. 8, the equipment 1 is described as including the aspirator 3 to draw in fluid on the pipe 5*e* side, but is not limited to this example. The equipment 1 may include at least one of any pump, any suction bottle, or any pump and any suction bottle to draw fluid in on the pipe 5*e* side, instead of or in addition to the aspirator 3. On the other hand, the equipment 1 is described as including the suction bottle 4 to draw in fluid on the pipe 5*f* side, but is not limited to this example. The equipment 1 may include at least one of any pump, any aspirator, or any pump and any aspirator to draw fluid in on the pipe Sf side, instead of or in addition to the suction bottle 4.

For example, according to an embodiment described above, the equipment 1 is described as supplying fluid to the negatively charged membrane 2 by creating a reduced pressure condition, but is not limited to this example. For example, the equipment 1 may supply fluid to the negatively charged membrane 2 by creating a pressurized condition with any pump. Additional valves may be provided in both the pipe 5*e* and the pipe 5*f* to select the pipe through which the fluid supplied to the negatively charged membrane 2 flows.

For example, according to an embodiment described above, the calculator 12 is described as calculating the index value of the inhibitor and the controller 13 is described as determining whether or not to remove the inhibitor from the concentrate, but are not limited to this example. The calculator 12 may perform these processes together. Conversely, the controller 13 may perform these processes together. In this case, the control apparatus 10 does not need to include the calculator 12.

For example, the water treatment system 100 may perform only one of the water treatment methods described according to Embodiment 1 and Embodiment 2 above, or may perform the water treatment methods in combination with each other.

In the water treatment method according to an embodiment of the present disclosure, multiple detection points for the inhibitor may be installed depending on the application, such as water treatment infrastructure. The water treatment method according to an embodiment of the present disclosure may be performed as a water sampling point before and/or after each step or before and/or after the entire water treatment process in a water treatment infrastructure.

Sudden fluctuations in index values of inhibitors, for example, in river drawdowns and the like, are known to occur due to weather and other factors. Thus, the water treatment system 100 may routinely detect the inhibitor while assessing impact on the later microbial measurement step. The control apparatus 10 may constantly calculate the index value of at least one inhibitor through arithmetic operations.

Figure 7:
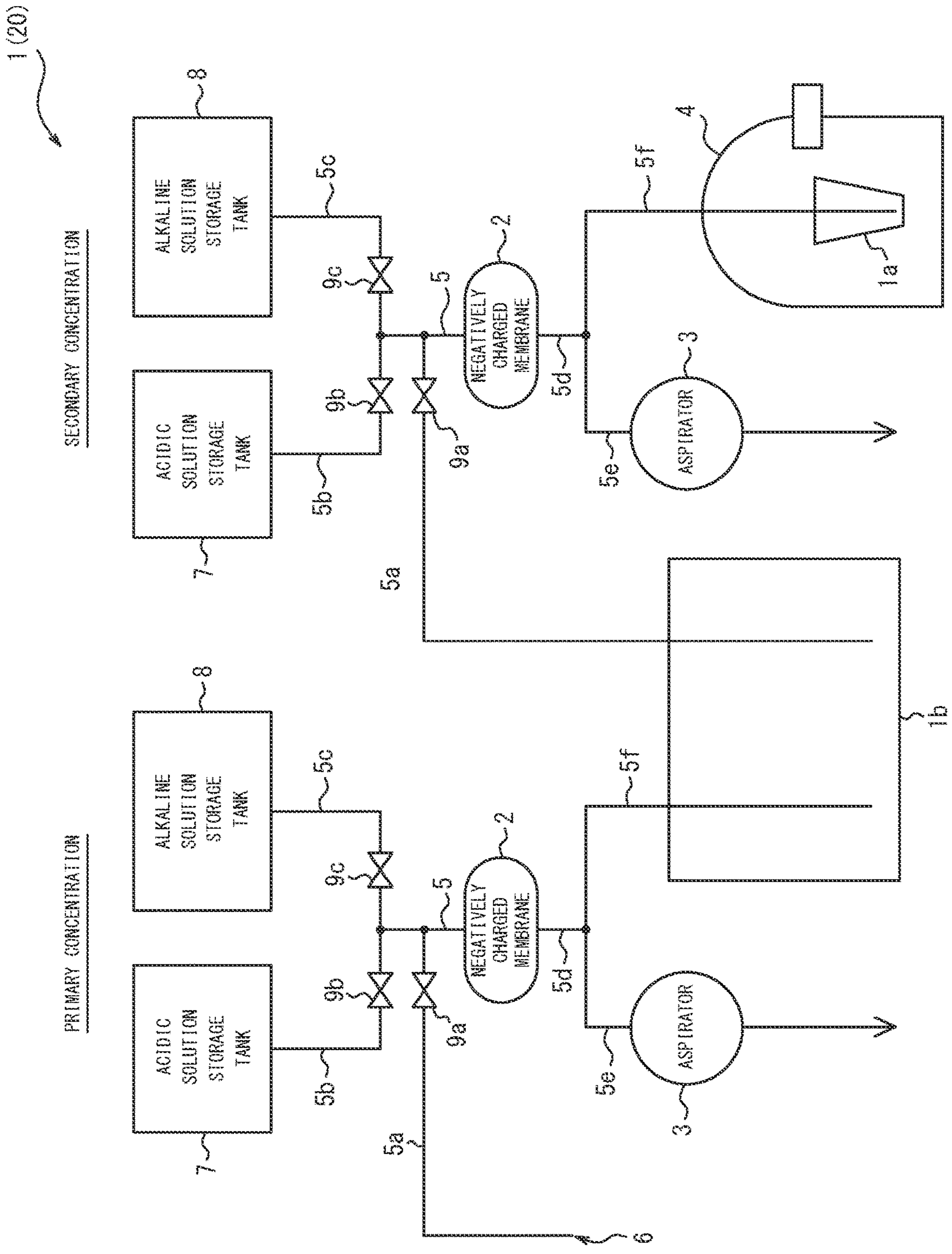
FIG. 7 is a schematic diagram of a modification of a concentration apparatus of a water treatment system according to an embodiment of the present disclosure.

FIG. 7 is a schematic diagram of a modification of the concentration apparatus 20 of the water treatment system 100 according to an embodiment of the present disclosure. According to Embodiment 1 and Embodiment 2 above, the concentration step by the concentration apparatus 20 is described as a single step, but is not limited to this example. The concentration step by the concentration apparatus 20 may include a primary concentration step and a secondary concentration step performed after the primary concentration step. This allows microorganisms to be concentrated and the concentrate purified even for large volumes of sample water.

In this case, the configuration illustrated in FIG. 8 may be combined over two levels in the equipment 1. For example, the primary concentrate purified by the primary concentration step may be collected in a stirrer 1*b* of the equipment 1. The stirrer 1*b* is depressurized by the aspirator 3 on the secondary concentrate side, which creates a depressurized condition, and fluid is drawn in by supplying the alkaline solution to the primary concentrate side to the negatively charged membrane 2. The primary concentrate collected in the stirrer 1*b* is drawn into the secondary concentrate side by the aspirator 3 on the secondary concentrate side, which creates a reduced pressure condition. For example, the secondary concentrate purified by the secondary concentration step may be collected in the concentrate collection container 1*a* of the equipment 1.

The alkaline aqueous solution on the primary concentrate side is supplied to the stirrer 1*b* by driving the aspirator 3 on the secondary concentrate side, but is not limited to this example. The alkaline aqueous solution on the primary concentrate side may be supplied to the stirrer 1*b* based on driving any pump additionally disposed in the pipe 5*f* on the primary concentrate side, for example. The aspirator 3 on the secondary concentrate side may be driven after the collection of primary concentrate to the stirrer 1*b* is completed.

The detection step by the control apparatus 10 may be performed after the primary concentration step by the concentration apparatus 20. In the detection step by the control apparatus 10, the inhibitor in the primary concentrate collected in the stirrer 1*b*, for example, may be detected. The removal step by the removal apparatus 30 may be performed as needed on at least one of the primary concentrate collected in the stirrer 1*b* and the secondary concentrate collected in the concentrate collection container 1*a*. As described above, the water treatment system 100 may perform the detection step to determine whether the removal step is necessary without loss of sample when volume is scarce after the secondary concentration.

The detection step by the control apparatus 10 may be performed after the secondary concentration step by the concentration apparatus 20. In the detection step by the control apparatus 10, the inhibitor in the secondary concentrate collected in the concentrate collection container 1*a*, for example, may be detected. This allows the water treatment system 100 to directly determine presence or absence of the inhibitor or the index value of the inhibitor for the secondary concentrate used in the subsequent microorganism measurement step. The water treatment system 100 may perform the determination step via the control apparatus 10 described above based on a sample that directly reflects status of the inhibitor in the secondary concentrate used in the subsequent microorganism measurement step.

For example, the water treatment system 100 may perform only one of the above two detection steps by the control apparatus 10, or the two detection steps may be performed in combination with each other.

For example, in the water treatment system 100 of an embodiment described above, the microorganism measurement step may be performed on the sample without the removal step of removing the inhibitor being performed. The removal step of removing the inhibitor may be performed on a relevant sample stored in the event that the inhibitor is later checked and the inhibitor is detected, and the microbial measurement step may be performed again.

For example, based on the water treatment system 100 according to an embodiment described above, contamination and removal status may be monitored based on the number of individual microorganisms present, regardless of whether the microorganisms are alive or dead.

The water treatment system 100 described above may be used in a variety of fields and applications. For example, the water treatment system 100 can be used to monitor water quality management and treatment performance of water treatment infrastructure, including water purification plants, sewage treatment plants, water reclamation facilities, seawater desalination facilities, and the like. The water treatment system 100 may be used to monitor the treatment performance of coagulation tanks, sedimentation tanks, sand filtration, microfiltration membranes, ultrafiltration membranes, reverse osmosis membranes, ozone contact tanks, activated carbon filtration tanks, ultraviolet irradiation tanks, disinfection tanks using chlorinating agents, and the like, which make up water treatment infrastructure. The water treatment system 100 may be used to test water quality regarding particulates, colloidal dispersion systems, microorganisms, and the like, to monitor dynamics in environmental studies of rivers, oceans, water features, and the like. The water treatment system 100 may be used to test water quality regarding particulates, colloidal dispersion systems, microorganisms, and the like, to determine the risk of microbial infection in cities covering water bodies and environmental infrastructure. The water treatment system 100 may be used to test water quality regarding particulates, colloidal dispersion systems, microorganisms, and the like for purposes such as qualitative risk, safety monitoring, and quality control of liquids used for beverages or in the production of processed food, to quantify risk or to verify against a threshold to determine safety. The water treatment system 100 may be used for quality control of pharmaceutical production.

In the water treatment system 100, a sampling time of the sample water may be varied to allow for applications in the various fields mentioned above, including water supply, food, drinking water, and the like. The shape of a water sampling port for water sampling may be varied, and a removable water sampling port may be adopted.

REFERENCE SIGNS LIST

1 Equipment
1*a* Concentrate collection container
1*b* Stirrer
2 Negatively charged membrane
3 Aspirator
4 Suction bottle
5 Pipe
5*a* First pipe
5*b* Second pipe
5*c* Third pipe
5*d* Pipe
5*e* Pipe
5*f* Pipe
6 Sample water supply port
7 Acidic solution storage tank
8 Alkaline solution storage tank
9*a* Valve
9*b* Valve
9*c* Valve
10 Control apparatus
11 Sensor
12 Calculator
13 Controller
20 Concentration apparatus
30 Removal apparatus
40 Measurement apparatus
100 Water treatment system
100*a* First path
100*b* Second path
100*c* First solenoid valve
100*d* Second solenoid valve

The invention claimed is:

1. A water treatment method comprising:
concentrating sample water containing microorganisms to obtain a purified concentrate comprising the microorganisms;
detecting an inhibitor contained in the sample water or the concentrate to obtain a detection result;
determining whether remove the inhibitor from the concentrate based on the detection result;
removing the inhibitor from the concentrate when determined to be performed in the determining; and
measuring the microorganisms contained in the concentrate after the determining or the removing;
wherein conditions for the removing are determined according to an index value of the inhibitor, said conditions including:
at least one of a type, number, frequency, sequence, and duration of the removing; and/or the amount of reagent to be used in the removing.

2. The water treatment method of claim 1, wherein
in the determining, whether the index value of the inhibitor has reached a threshold value is determined, and
in the determining, upon determining that the index value of the inhibitor has reached the threshold value, the removing is performed.

3. The water treatment method of claim 2, wherein
the threshold value is set from an empirical value for rainfall conditions.

4. The water treatment method of claim 2, wherein
the threshold value is calculated based on machine learning with feedback of the index value of the inhibitor.

5. The water treatment method of claim 4, wherein
the threshold value is calculated based on results obtained from multivariate analysis including principal component regression analysis and classification of the index value, or the threshold value is calculated based on results obtained from neural networks.

6. The water treatment method of claim 1, wherein
the detecting is performed after the concentrating, and
in the detecting, the inhibitor contained in the concentrate is detected.

7. The water treatment method of claim 1, wherein
the detecting is performed before the concentrating, and
in the detecting, the inhibitor contained in the sample water is detected.

8. The water treatment method of claim 1, wherein
the concentrating includes a primary concentrating and a secondary concentrating performed after the primary concentrating.

9. The water treatment method of claim 8, wherein
the detecting is performed after the primary concentrating, and
in the detecting, the inhibitor contained in a primary concentrate, which comprises the microorganisms, is detected.

10. The water treatment method of claim 8, wherein
the detecting is performed after the secondary concentrating, and
in the detecting, the inhibitor contained in a secondary concentrate, which comprises the microorganisms, is detected.

11. A control apparatus comprising:
a sensor configured to detect an inhibitor contained in sample water containing microorganisms or a concentrate purified by concentrating microorganisms in the sample water; and
a controller configured to determine whether to remove the inhibitor from the concentrate based on a detection result obtained by the sensor;

wherein, when the controller determines that the inhibitor is to be removed from the concentrate, the controller is configured to control a water treatment process so that the concentrate passes through a removal apparatus that removes the inhibitor from the concentrate prior to measurement of the microorganisms, in a removing, the removal apparatus determining conditions for the removing according to an index value of the inhibitor, said conditions including:

at least one of a type, number, frequency, sequence, and duration of the removing; and/or the amount of reagent to be used in the removing.

12. A water treatment system comprising:

the control apparatus of claim 11;

a concentration apparatus operable to concentrate the microorganisms in the sample water to purify the concentrate;

the removal apparatus operable to remove the inhibitor from the concentrate; and a measurement apparatus operable to measure the microorganisms in the concentrate.

* * * * *